United States Patent [19]

Hirose

[11] E Patent Number: Re. 32,809

[45] Reissued Date of Patent: Dec. 27, 1988

[54] FULLY ROTATING HOOK FOR A LOCK STITCH SEWING MACHINE

[75] Inventor: Tokuzo Hirose, Osaka, Japan

[73] Assignee: Hirose Manufacturing Company Limited, Osaka, Japan

[21] Appl. No.: 54,395

[22] Filed: May 26, 1987

Related U.S. Patent Documents

Reissue of:

[64] Patent No.: 4,577,572
Issued: Mar. 25, 1986
Appl. No.: 591,194
Filed: Mar. 16, 1984

[30] Foreign Application Priority Data

Sep. 6, 1983 [JP] Japan ..... 58-164876

[51] Int. Cl.[4] ..... D05B 57/08; D05B 57/26; D05B 71/02

[52] U.S. Cl. ..... 112/231; 112/256

[58] Field of Search ..... 112/181, 182, 183, 184, 112/228, 231, 256; 57/124

[56] References Cited

U.S. PATENT DOCUMENTS

| | | | |
|---|---|---|---|
| 730,692 | 6/1903 | Parkes | 112/230 |
| 1,188,818 | 6/1916 | Parkes | 112/256 X |
| 1,596,487 | 8/1926 | Hohmann et al. | 112/228 |
| 2,907,165 | 10/1959 | Adams et al. | 57/124 X |
| 3,146,744 | 9/1964 | Bradshaw | 112/232 |
| 3,509,840 | 5/1970 | Rovin | 112/181 |
| 3,769,925 | 11/1973 | Von Hagen | 112/256 |

FOREIGN PATENT DOCUMENTS

| | | | |
|---|---|---|---|
| 1510918 | 3/1971 | Fed. Rep. of Germany | 57/124 |
| 679949 | 9/1952 | United Kingdom | 112/181 |
| 1000365 | 8/1965 | United Kingdom | 57/124 |

*Primary Examiner*—Andrew M. Falik
*Attorney, Agent, or Firm*—Wenderoth, Lind & Ponack

[57] ABSTRACT

A fully rotating hook [includes an outer member or rotary loop taker having a track groove therein and an inner shuttle member or bobbin case a projection extending into the groove. A spaced relation between the track groove and the projection is maintained by feeding compressed air into a clearance therebetween.] *assembly for a lock stitch sewing machine having an inner bobbin case for supporting a thread bobbin with a track projection extending circumferentially around the bobbin case, an outer loop taker mounted about the bobbin case and having a track groove extending circumferentially around an inner peripheral surface thereof and air passages for injecting compressed air into a clearance between adjacent surfaces of the projection and the groove. The air passages can be formed in the groove of the loop taker and in the projection. The projection includes a groove extending radially inwardly from a radially outermost surface and a plurality of exhaust holes extend from the groove to axial end surfaces of the projection. Compressed air is supplied to the air holes opening into the groove to thereby create an air film between the surfaces of the projection and the confronting surfaces of the groove.*

2 Claims, 5 Drawing Sheets

FULLY ROTATING HOOK FOR A LOCK STITCH SEWING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to a fully rotary or rotating hook for a sewing machine and more particularly, to an improved construction of a fully rotating hook for eliminating disadvantages due to rotational friction between an inner shuttle member or bobbin case and an outer shuttle member or loop taker.

2. Description of the Prior Art

In FIGS. 1 and 2 illustrating a prior art arrangement, there is shown a vertical fully rotating hook 1 which is held at a needle descending position, with an inner shuttle member or bobbin case 3 accommodated in an outer shuttle member or rotary loop taker 2. In the inner bobbin case 3, there is mounted a bobbin 11 for winding a bobbin thread therearound. The inner bobbin case 3 is stopped against rotation by an inner loop taker retaining member (not shown) which is fixed to a machine body. Along an outer peripheral surface of the inner bobbin case 3, there is formed an externally directed flange-like track projection 5 extending in a circumferential direction partially throughout the circumference. This projection 5 is fitted into an internally directed flange-like track groove 6 extending in a circumferential direction along a portion of the inner peripheral surface of the outer loop taker 2. The outer loop taker 2 may be driven for rotation in one direction about an axis by a drive means (not shown) connected to a rotary shaft 16. For rotating the outer loop taker 2 in the state where the inner bobbin case 3 is stopped from rotation as described above, a lubricating oil or the like is supplied between contact faces 4 of the track projection 5 of the inner bobbin case 3 and the track groove 6 of the outer loop taker 2 so as to reduce friction between such two elements.

In this prior art device, however, during high speed rotation of the vertical fully rotating hook 1, friction still exists between the outer loop taker 2 and the inner bobbin case 3, even when the lubricating oil or the like is applied thereto, thus resulting in abrasion of the rotary hook 1. Moreover, the thread or the like tends to be soiled by the lubricating oil, and thus it has been difficult to carry out a sewing operation smoothly in an efficient manner.

SUMMARY OF THE INVENTION

Accordingly, it is a primary object of the present invention to provide an improved fully rotating hook in which smooth movements between an outer shuttle member or rotary loop taker and an inner shuttle member or bobbin case can be achieved without employment of lubricating oil, thereby eliminating the technical problems described above.

In accomplishing the above object, the fully rotating hook for a lock stitch sewing machine according to the present invention includes an outer shuttle member or rotary loop taker having formed therein a track groove, with at least one air blast hole formed in the track groove. A spaced relation is maintained between the track groove and a projection of the inner bobbin case by jetting compressed air from the air blast hole into a clearance between the surfaces of the groove and the projection.

DETAILED DESCRIPTION OF THE PREFERRED EMBODIMENTS

Figure 1:
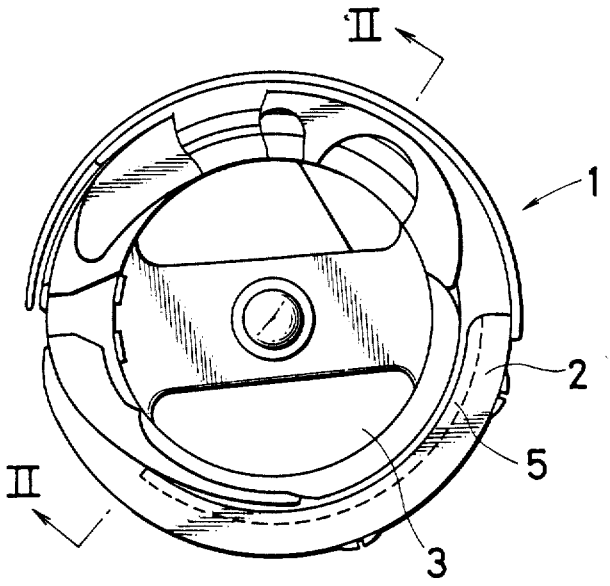
Fig. 1 Prior Art
FIG. 1 is a top plan view of a conventional fully rotating hook.
Figure 2:
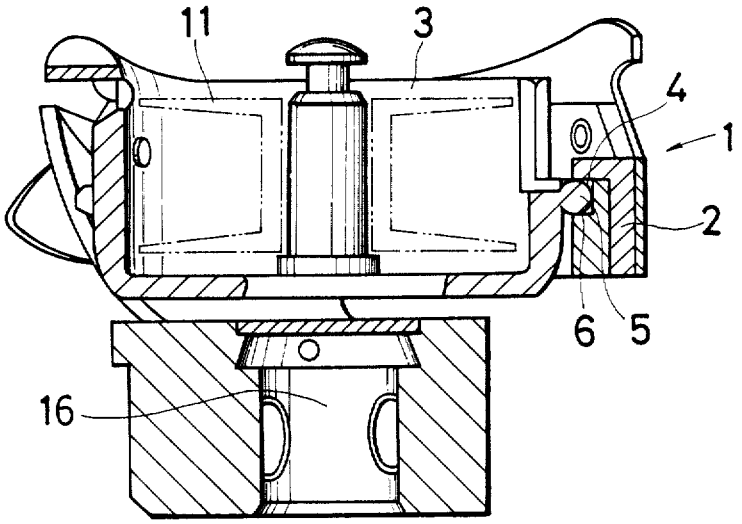
Fig. 2 Prior Art
FIG. 2 is a cross section taken along the line II—II in FIG. 1.
Figure 3:
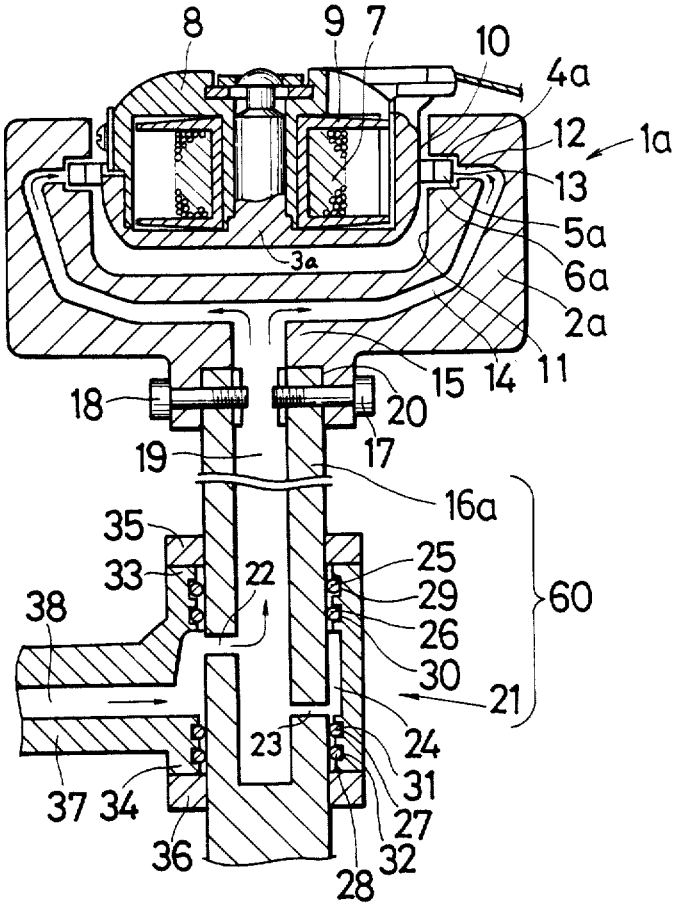
FIG. 3 is a longitudinal sectional view of a fully rotating hook according to one preferred embodiment of the present invention.

Referring to FIG. 3, there is shown a longitudinal sectional view of one preferred embodiment according to the present invention, in which portions corresponding to like parts in the prior art arrangement of FIG. 2 are designated by similar reference numerals, but followed by the suffix "a".

In the arrangement of FIG. 3, an upper bobbin case member 8 is mounted within an inner shuttle member or lower bobbin case member 3a. A bobbin 9 having wound therearound thread 7 is accommodated within members 3a and 8. A track projection 5a extends outwardly in the circumferential direction, partially throughout the circumference as in the prior art arrangement described above, from an outer peripheral surface of member 3a, and projection 5a is fitted into a circumferentially extending track groove 6a formed in an inner peripheral surface 11 of outer shuttle member or rotary loop taker 2a throughout a portion of the circumference. In the track groove 6a of the outer loop taker 2a, one or more air blast holes 12 are formed to confront an outer portion 13 of the projection 5a of member 3a. These air blast holes 12 are communicated with a hollow portion or passages 14 of the outer loop taker 2a.

Into a bottom portion 15 of the outer loop taker 2a is fitted one end of a cylindrical rotary shaft 16a which is positioned coaxially with the axis of outer loop taker 2a. The hollow portion 14 of the outer loop taker 2a is communicated with a hollow portion or passage 19 of the rotary shaft 16a, while a fitting 20 between the outer loop taker 2a and the rotary shaft 16a is fixed by fixing members 17 and 18 so as to achieve airtightness.

In the vicinity of a central portion of the rotary shaft 16a, there are provided vent holes 22 and 23. A cylindrical pipe joint 21 is coaxially mounted about the rotary shaft 16a in a manner to cover vent holes 22 and 23. The pipe joint 21 has an inner diameter slightly larger than an outer diameter of the rotary shaft 16a, and a clearance 24 between the pipe joint 21 and the rotary shaft 16a is communicated with the hollow portion 19 of the rotary shaft 16a through the vent holes 22 and 23. At positions bridging the vent holes 22 and 23 of the rotary shaft 16a in the clearance 24, there are mounted O rings 25, 26, 27 and 28 which contact the outer peripheral surface of the rotary shaft 16a in circumferential directions. These O rings 25 to 28 are respectively fitted into concave grooves 29, 30, 31 and 32 extending in circumferential directions along the inner peripheral surface of the pipe joint 21. Concave grooves 29 and 32 prevent displacement of the positions of the O rings 25 to 28. Owing to the O rings 25 to 28 mounted to bridge the vent holes 22 and 22 in the manner described above, it is possible to prevent air leakage through the clearance 24 between the pipe joint 21 and the rotary shaft 16a. Moreover, at opposite axial ends 33 and 34 of the pipe joint 21, there are provided bearings 35 and 36 which rotatably support the rotary shaft 16a extending through the pipe joint 21.

The clearance 24 between rotary shaft 16a and the pipe 21 leading to the hollow portion 19 of the rotary shaft 16a is communicated with a hollow portion or passage 38 of an air feed pipe 37 extending from the pipe joint 21, with the end portion of the air feed pipe 37 being connected to an air compressor pump, not shown.

The compressed air fed from the air compressor pump passes through the air feed pipe 37 and is fed from clearance 24 through vent holes 22 and 23 into the hollow portion 19 of the rotary shaft 16a. The compressed air is further fed from the hollow portion 19 of the rotary shaft 16a through the hollow portion 14 of the outer loop taker 2a and through the air blast holes 12. Thus, the compressed air is jetted from the air blast holes 12 into a clearance 4a between the track groove 6a and the projection 5a. As a result, an air film is formed in the clearance 4a, and thus, the sliding resistance or friction between the rotating track groove 6a and the stationary projection 5a are eliminated.

By providing the air blast mechanism as described above in the outer loop taker 2a, high speed operations at speeds of more than 5000 to 6000 stitches per minute, which are considered to be a limit in sewing machines employing conventional fully rotating hooks, may be advantageously realized. Moreover, through elimination of the sliding resistance between the outer loop taker 2a and the inner bobbin case 3a, sliding noises occurring in conventional hooks are eliminated, with a consequent elimination of an unpleasant atmosphere for operators of the sewing machine. Furthermore, since air under high pressure is directed towards the inner bobbin case 3a at all times, it is possible to simultaneously obtain a cleaning effect and cooling effect for the fully rotating hood 1a. It is to be noted that materials for the inner bobbin case 3a may be light weight alloys, plastics, etc.

Figure 4:
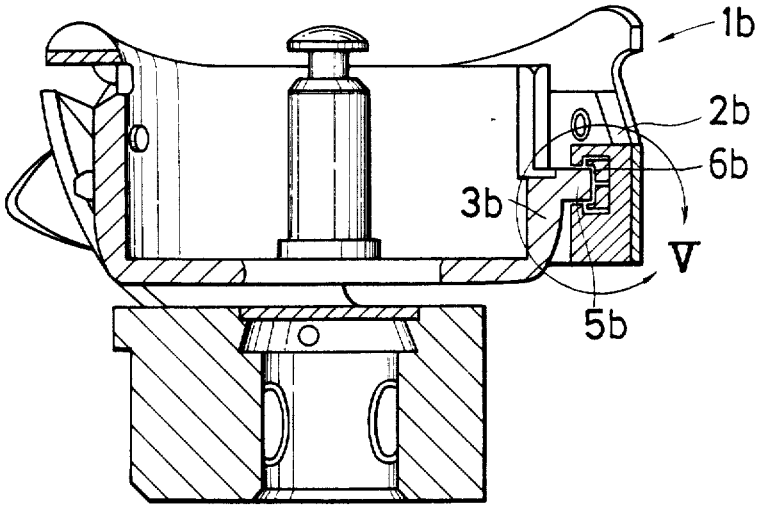
FIG. 4 is a view similar to a portion of FIG. 3, but of another embodiment of the invention.
Figure 5:
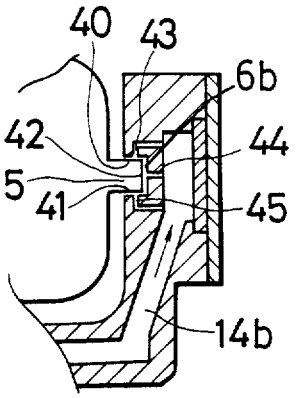
FIG. 5 is a fragmentary cross sectional view on an enlarged scale of a section V in FIG. 4.

FIG. 4 is a longitudinal sectional view of another embodiment according to the present invention, while FIG. 5 is a cross sectional view showing a section V in FIG. 4 on an enlarged scale. The construction of FIG. 4 resembles that of FIG. 3, with corresponding parts being designated by similar reference numerals, but followed by the suffix "b". A track projection 5b of the inner shuttle member or bobbin case 3b is fitted into the track groove 6b of the outer shuttle member or loop taker 2a. In the track groove 6b are formed air blast holes 43, 45 and 44 respectively confronting side portions 40 and 41 and outer portion 42 of the projection 5b. Blast holes 43 to 45 are communicated with a hollow portion 14b of the outer loop taker 2a. By jetting the compressed air in the three illustrated directions shown in FIG. 5, the surfaces of the projection 5b and the track groove 6b may be positively maintained in spaced relation from each other, and the functions of the fully rotating hook 1b further will be improved.

Figure 6:
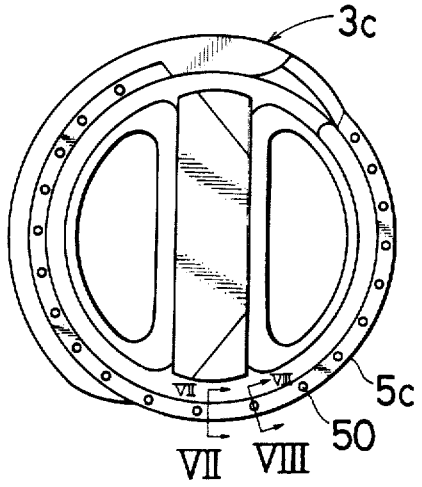
FIG. 6 is a top plan view of an inner shuttle member or bobbin case according to a further embodiment of the present invention.
Figure 7:
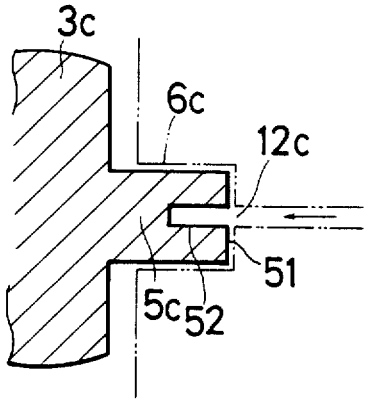
FIG. 7 is a fragmentary cross section taken along the line VII—VII in FIG. 6.
Figure 8:
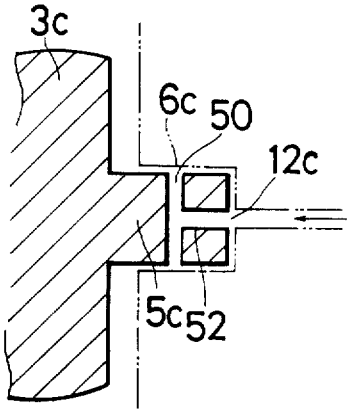
FIG. 8 is a fragmentary cross section taken along the line VIII—VIII in FIG. 6.

FIG. 6 is a top plan view of an inner shuttle member or bobbin case 3c according to a further embodiment of the present invention. FIG. 7 is a cross section taken along the line VII—VII in FIG. 6, and FIG. 8 is also a cross section taken along the line VIII—VIII in FIG. 6. In an outer portion 51 of a track projection 5c of the inner bobbin case 3c is formed a circumferential concave groove 52. At least one or more elongated openings 12c are provided in a track groove 6c to confront groove 52. Also, exhaust holes 50 connected with concave groove 52 are formed in projection 5c to extend in vertical upward and downward directions. The exhaust holes 50 are provided at spaced intervals in the circumferential direction of the projection 5c *and the exhaust holes 50 extend axially from the circumferential groove 52 to axial end surfaces of the projection 5c.*

The compressed air fed from the compressor pump is jetted from the elongated openings 12c of the outer loop taker into the concave groove 52 of the projection 5c of the inner bobbin case 3c, and is discharged through the exhaust holes 50 connected with the concave groove 52. By discharging the compressed air from the exhaust holes 50 extending in the upward and downward directions of the projection 5c as described above, a spaced relation between the surfaces of projection 5c and the track groove 6c may be positively achieved.

The vertical fully rotating hook according to each embodiment of the present invention may be readily coupled with the air jetting device 60 shown in FIG. 3, without requiring a large-scale remodeling of the conventional sewing machine. Moreover, the present invention may also be applied to a horizontal fully rotating hook as well.

As is clear from the foregoing description, according to the present invention it is possible to prevent the rotating hooks from being abraded due to high speed rotation by eliminating the undesirable sliding resistance or friction between the inner shuttle member or bobbin case and the outer shuttle member or loop taker through employment of compressed air. Furthermore, owing to the elimination of soiling of threads and the like by oil as experienced in conventional arrangements, the fully rotating hook according to the present invention provides marked improvements of the sewing performance and productivity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a [vertically oriented] fully rotating hook assembly for a lock stitch sewing machine and being of the type including an inner bobbin case for supporting a thread bobbin, said bobbin case having formed on an outer peripheral surface thereof a track projection extending circumferentially of said bobbin case over a portion of the circumference thereof, an outer loop taker mounted about said bobbin case[,] said loop taker having formed in an inner peripheral surface thereof a track groove extending circumferentially of said loop taker over a portion of the circumference thereof, means for rotating said loop taker about [a vertical] *an* axis such that relative rotation occurs between said loop taker and said bobbin case, with such rotation being guided by said projection fitting within said groove, and means for reducing friction during such rotation between adjacent surfaces of said projection and groove, the improvement wherein said friction reducing means comprises:

means for injecting compressed air into a clearance between said adjacent surfaces and thereby for forming *an* air [films] *film* between [upper, lower and radially outermost] said *adjacent* surfaces of said projection and [adjacent complementary said surfaces of] said groove;

said injecting means comprising at least one air passage formed in said loop taker, a plurality of air holes opening into said groove and connected to said air passage, and means for supplying compressed air to said air passage and thereby injecting the compressed air through said air holes into said clearance;

said supplying means comprising said rotating means being in the form of a hollow rotatable shaft fixed to [the bottom of] said loop taker, said shaft having therethrough a passage connected to said air passage in said loop taker, said shaft having therethrough a hole connected to said passage in said shaft, and means for introducing compressed air through said hole into said passage in said shaft; and said introducing means comprising a pipe fixed in position surrounding a portion of said shaft having therein said hole, said shaft being rotatable within said pipe, means defining a sealed clearance between said shaft and said pipe, said sealed clearance being connected to said hole, and an air feed pipe connected to said pipe for supplying compressed air therethrough and into said sealed clearance.

2. In a [vertically oriented] fully rotating hook assembly for a lock stitch sewing machine and being of the type including an inner bobbin case for supporting a thread bobbin, said bobbin case having formed on an outer peripheral surface thereof a track projection extending circumferentially of said bobbin case over a portion of the circumference thereof, an outer loop taker mounted about said bobbin case, said loop taker having formed in an inner peripheral surface thereof a track groove extending circumferentially of said loop taker over a portion of the circumference thereof, means for rotating said loop taker about [a vertical] *an* axis such that relative rotation occurs between said loop taker and said bobbin case, wtih such rotation being guided by said projection fitting within said track groove, and means for reducing friction during such rotation between adjacent surfaces of said projection and track groove, the improvement wherein said friction reducing means comprises:

means for injecting compressed air into a clearance between said adjacent surfaces and thereby for forming *an* air [films] *film* between [upper, lower and radially outermost] said surfaces of said projection and [adjacent complementary said surfaces of] said track groove, said injecting means comprising a groove formed in said projection and extending radially inwardly from [said] *a* radially outermost surface thereof, a plurality of exhaust holes extending [vertically] *axially* from said inwardly extending groove to [said upper and lower] *axial end* surfaces of said projection, at least one air passage formed in said loop taker, a plurality of air holes in said loop taker, said air holes being connected to said air passage and opening into said track groove at a position confronting said inwardly extending groove in said projection, and means for supplying compressed air to said air passage and thereby injecting the compressed air through said air holes and said clearance and radially inwardly into said inwardly extending groove, whereby said exhaust holes then discharge said compressed air [vertically upwardly and downwardly] *axially* from said [upper and lower] *axial end* surfaces.

* * * * *